United States Patent
Tanimura et al.

(10) Patent No.: US 6,835,770 B1
(45) Date of Patent: *Dec. 28, 2004

(54) PROCESS FOR PRODUCING POLYOLEFIN-BASED RESIN COMPOSITION

(75) Inventors: Hiroyuki Tanimura, Sodegaura (JP); Takeshi Ebara, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 106 days.

This patent is subject to a terminal disclaimer.

(21) Appl. No.: 09/689,592

(22) Filed: Oct. 13, 2000

(30) Foreign Application Priority Data

Oct. 15, 1999 (JP) ............................................ 11-293994

(51) Int. Cl.$^7$ ................................................. C08J 3/00
(52) U.S. Cl. ....................... 524/523; 524/515; 524/525; 524/528
(58) Field of Search ................................ 524/528, 515, 524/523, 525, 356, 366, 379, 289, 474, 476

(56) References Cited

U.S. PATENT DOCUMENTS

| | | | |
|---|---|---|---|
| 4,818,785 A | * | 4/1989 | Otawa et al. ................ 524/536 |
| 5,601,923 A | * | 2/1997 | Koyama et al. ............. 428/357 |
| 5,753,362 A | * | 5/1998 | Kawase et al. .............. 428/327 |
| 5,936,048 A | * | 8/1999 | Oishi et al. .................. 524/100 |
| 6,183,866 B1 | * | 2/2001 | Yamazaki et al. ........... 428/403 |
| 6,340,443 B1 | * | 1/2002 | Kurihara et al. ............. 264/464 |
| 6,479,579 B1 | * | 11/2002 | Tanimura et al. ............ 524/523 |

FOREIGN PATENT DOCUMENTS

| | | |
|---|---|---|
| DE | 19856576 A1 | 6/1999 |
| EP | 0718360 | 6/1996 |
| EP | 0659823 | 10/1997 |
| JP | 5764522 | 4/1982 |
| JP | 4296353 A2 | 10/1992 |
| JP | 5214120 | 8/1993 |
| JP | 6107868 | 4/1994 |
| JP | 11172069 | 6/1999 |

* cited by examiner

Primary Examiner—Judy M. Reddick
(74) Attorney, Agent, or Firm—Birch, Stewart, Kolasch & Birch, LLP

(57) ABSTRACT

A process for a polyolefin-based resin composition, which comprises melt-kneading 100 parts by weight of a polyolefin-based resin and not less than 0.05 parts by weight and less than 2 parts by weight of polymer fine particles containing 0.10 to 90% by weight of a volatile component as an anti-blocking agent.

4 Claims, No Drawings

PROCESS FOR PRODUCING POLYOLEFIN-BASED RESIN COMPOSITION

BACKGROUND OF THE INVENTION

1. Field of the Invention

The present invention relates to a process for producing a polyolefin-based resin composition, and more particularly, to a process for producing polyolefin-based resin composition providing film which has a good dispersion of polymer fine particles as an anti-blocking agent to a polyolefin-based resin, and is excellent in appearances such as transparency, see-through feeling, little generation of white spot (called as fish-eye) and the like, and in anti-blocking property.

2. Description of the Related Arts

A polyolefin-based resin film is used for materials for food packaging and textile packaging, and the like, because it is superior in physical properties such as transparency, mechanical property and the like.

However, the polyolefin-based resin in which an anti-blocking agent was added, has been used because the film made of the polyolefin-based resin not containing the anti-blocking agent has an insufficient anti-blocking property, piled films are mutually adhered, and the operability at packaging is lowered.

In place of these finely powdery or fine particle-like inorganic materials, a polyolefin-based resin composition using polymer fine particles as an anti-blocking agent is reported. For example, a polymer fine particles having a particle diameter of 3 to 40 μm and no meting point in JP-A-57-64522, an inert organic polymer crosslinked particles having a weight average particle diameter of 0.5 to 7 μm in JP-A-05-214120, and a polyolefin-based resin composition using particles of a crosslinked polymer, as an anti-blocking agent, obtained by copolymerizing an acrylic monomer and a styrene monomer as main components which has a weight average particle diameter of 0.4 to 7 μm and a film made of the composition in JP-A-06-107868, are reported.

However, although the dispersability of the polymer fine particles as the anti-blocking agent in the polyolefin-based resin was fairly improved compared to that of an inorganic anti-blocking agent such as silica fine particles, to that of the polymer fine particles as the anti-blocking agent in the polyolefin-based resin is not necessarily sufficient, and the polyolefin-based composition contained coagulated matters of the polymer fine particles. When a film is produced by forming into the film from the polyolefin-based composition, there were problems that the coagulated matters are not dispersed, white spots caused by the coagulated matters are generated, the appearance of the film is deteriorated, and points not inked to the film are generated at printing, etc.

The above-described problems have been appeared in accordance with heightening of levels required in film properties.

SUMMARY OF THE INVENTION

Under these circumstances, the present inventors have intensively studied and as a result, found that the above-mentioned problems can be solved by using a polyolefin-based resin composition prepared by melt-kneading a polyolefin-based resin with polymer fine particles, as an anti-blocking agent, containing a specific quantity of a volatile component thereby to complete the present invention.

An object of the present invention is to provide a process for producing a polyolefin-based resin composition being able to provide a polyolefin-based resin film which has a good dispersion of polymer fine particles as an anti-blocking agent in a polyolefin-based resin, and is good in appearances such as transparency, see-through feeling, little generation of white spot (occasionally called as fish eye) and the like, and in anti-blocking property and the like.

Namely, the present invention relates to a process for producing a polyolefin-based resin composition, which comprises melt-kneading 100 parts by weight of a polyolefin-based resin (A) and not less than 0.05 parts by weight and less than 2 parts by weight of a polymer fine particles (B) containing 0.10 to 90% by weight of a volatile component, as an anti-blocking agent, and further, to a film made of the above-mentioned polyolefin-based resin composition.

DETAILED DESCRIPTION OF THE INVENTION

The present invention is illustrated in detail below.

The polyolefin-based resin(A) used in the present invention is a homopolymer or a copolymer of one or more of olefins.

The olefin includes ethylene and α-olefins having 3 to 12 carbon atoms such as propylene, 1-butene, 1-hexene, 4-methyl-1-pentene, 1-octene and the like.

As the polyolefin-based resin(A), a propylene-based resin is preferable. The propylene-based resin includes a propylene homopolymer and copolymers of propylene with ethylene and/or the α-olefin other than propylene such as a propylene-ethylene copolymer, a propylene-1-butene copolymer, a propylene-ethylene-1-butene copolymer, and the like.

The propylene-based resin preferably includes a crystalline propylene homopolymer and/or a crystalline propylene copolymer.

The crystallinity can be determined by the amount of the 20° C. xylene-soluble portion (hereinafter, referred to as "CXS") in the crystalline propylene homopolymer or the crystalline propylene copolymer. When the amount of the CXS is large; the homopolymer or copolymer contains a large amount of an amorphous portion and shows a low crystallinity. On the other hand, when the amount of the CXS is small, the homopolymer or copolymer contains a small amount of an amorphous portion and shows a high crystallinity. The content of the CXS is preferably 30% by weight or less, more preferably 20% by weight or less, and most preferably 15% by weight or less.

The more preferable propylene-based resin is a crystalline propylene homopolymer or crystalline propylene-copolymer having a total content of units derived from at least one monomer selected from ethylene 1-butene, 1-hexene, 4-methyl-1-pentene and 1-octene is 2% by weight or less.

The melt flow rate (hereinafter, referred to as "MFR") measured at 230° C. under a load of 2.16 kg/cm$^2$ according to JIS K7210 of the polyolefin-based resin used in the present invention is preferably 0.1 to 20 g/10 min. from the view point of processability and film properties, and more preferably 0.5 to 10 g/10 min.

Further, in the polyolefin-based resin used in the present invention, other polymers such as a styrene-based resin, an ethylene-propylene copolymer rubber, an ethylene-propylene-diene copolymer rubber and the like, may be optionally added within a range in which the object and effect of the present invention are not damaged.

Polymers constituting polymer fine particles (B) as an anti-blocking agent used in the present invention are not specifically limited, and there are illustrated polymers obtained by polymerizing at least one monomer selected from the group consisting of aromatic mono-vinyl compounds (e.g. styrene, α-methylstyrene), acrylic acid ester compounds (e.g. methyl acrylate, 2-ethylhexyl acrylate), methacrylic acid ester compounds (e.g. methyl methacrylate, 2-ethylhexyl methacrylate), mono-, di-carboxylic acid or di-carboxylic acid anhydrides (e.g. acrylic acid, methacrylic acid, maleic acid, maleic anhydride), vinyl cyanide compounds (e.g. acrylonitrile, methacrylonitrile), acrylic amide compounds (e.g. acrylamide, methacrylamide, N-methylol acrylamide, N-methylol methacrylamide), ionic monomers (e.g. sodium acrylate, sodium methacrylate, sodium styrene sulfonate) and the like. Among these, styrene, methyl acrylate, methyl methacrylate, 2-ethylhexyl acrylate and 2-ethylhexyl methacrylate are preferable.

As the polymerization process, there are can be used known processes, for example, a suspension polymerization, a micro suspension polymerization, a dispersion polymerization, an emulsion polymerization, a soap-free polymerization process, a seed polymerization process and the like. Particularly, an emulsion polymerization, a dispersion polymerization, a soap-free polymerization and a seed polymerization are preferable from the viewpoint of film property.

The polymer fine particles used in the present invention may be fine particles of a crosslinked polymer obtained by polymerizing using at least one crosslinking agent in combination at polymerization of the above-mentioned monomer. The crosslinking agent includes compounds having two or more of polymerizable double bonds in its molecule. Specific examples of the crosslinking agent include divinylbenzene, trimethylolpropane triacrylate, trimethylolpropane trimethacrylate, glycidyl acrylate, glycidyl methacrylate, allyl acrylate, allyl methacrylate, and the like. The crosslinked polymer fine particles are preferable because the shape is maintained to a certain degree in the respective steps of melt-kneading, sheet forming, and stretching in the film molding of the polyolefin-based resin.

The polymer fine particles used as an anti-blocking agent in the present invention, have a weight average particle diameter of 0.5 to 15 μm, preferably 0.8 to 10 μm, and more preferably 1.0 to 8.0 μm.

The volatile component contained in the polymer fine particles used in the present invention is not specifically limited, and for example, those usually used as a liquid medium can be mentioned. Specifically, alcohols, saturated hydrocarbons, aromatic hydrocarbons, ketones, aldehydes, organic acid esters, and ethers, or a mixture thereof can be mentioned. The alcohols include methanol, ethanol, propanol, pentanol, hexanol, octanol, benzyl alcohol, ethylene glycol and the like. The saturated hydrocarbons include pentane, hexane, heptane, octane and the like. The aromatic hydrocarbons include benzene, toluene, xylene and the like. The ketones include acetone, methyl ethyl ketone, methyl isobutyl ketone and the like. The aldehydes include acetaldehyde, propionaldehyde, benzaldehyde and the like. The organic acid esters include methyl acetate, ethyl acetate, octyl acetate, methyl butyrate, methyl methacrylate, methyl benzoate, ethyl benzoate and the like. The ethers include isopropyl ether, butyl ether, amyl ether, tetrahydrofuran, anisole and the like. Water, methanol, ethanol, propanol, hexane, heptane, toluene and xylene are preferable, and water is preferable in particular.

The amount of the volatile component contained in the polymer fine particles used in the present invention is 0.10 to 90% by weight and preferably 0.10 to 80% by weight.

Herein, the amount of the volatile component contained in the polymer fine particles is defined by the following equation.

$$(a)(\% \text{ by weight}) = \{((b)-(c))/(b)\} \times 100$$

wherein (a) shows content of the volatile component, (b) shows weight of polymer fine particles before drying, and (c) shows weight of polymer fine particles after drying.

When the volatile component content is less than 0.10% by weight, the dispersion into the polyolefin-based resin of the polymer fine particles often becomes insufficient.

On the other hand, when the content exceeds 90% by weight, the melt-extrusion happens to be impossible because feeding into a screw of an extruder of the mixture becomes difficult when the mixture of the polymer fine particles and the polyolefin-based resin is melt-extruded, or the resin extruded foams.

The method of adjusting the concentration of the volatile component contained in the polymer fine particles used in the present invention is not specifically limited, and for example, methods described below are mentioned.

① A method of leaving a liquid medium and/or washing liquid used in production of the polymer fine particles, in the polymer fine particles at a fixed concentration as the volatile component.

② A method of leaving a liquid medium and/or washing liquid used in production of the polymer fine particles, in the polymer fine particles at a high concentration as the volatile component, and removing the volatile component to adjust it to a fixed concentration. As a method of removing the volatile component, methods of drying the polymer fine particles using a spray dryer, a Nauter dryer, an oven dryer and the like are exemplified.

③ A method of leaving a liquid medium and/or washing liquid used in production of the polymer fine particles, in the polymer fine particles at a high concentration as the volatile component and removing the volatile component while mixing them with a polyolefin-based resin powder to adjust it to a fixed concentration. As a method of mixing with the powder and removing the volatile component, methods of using a Henschel mixer, a tumbler mixer, a Nauter dryer and the like are exemplified.

④ A method of perfectly removing a liquid medium and/or washing liquid used in the production of the polymer fine particles, and then newly adding a volatile component to the polymer fine particles to adjust it to a fixed concentration. As a method of removing the liquid medium and/or washing liquid, known methods such as filtration, drying and the like are illustrated.

In the production of the polyolefin-based composition of the present invention, the amount used of the polymer fine particles (component B) containing 0.10 to 90% by weight of the volatile component is not less than 0.05 parts by weight and less than 2 parts by weight per 100 parts by weight of the polyolefin-based resin (component A), and preferably 0.05 to 1.5 parts by weight.

When the amount of the polymer fine particles containing 0.10 to 90% by weight of the volatile component is less than 0.05 parts by weight, the anti-blocking property of a film obtained is often insufficient, and when it is 2 parts by weight or more, the anti-blocking property is not often improved by the addition of the excess amount.

The compounding method in the production of the polyolefin-based composition is not limited so far as homogeneous mixing of the polyolefin-based resin with the polymer fine particles containing 0.10 to 90% by weight of the volatile component is accomplished, and examples of the mixing method include methods of mixing using a ribbon blender, a Henschel mixer, a tumbler mixer and the like. Further, the polyolefin-based resin and the polymer fine particles may be directly melt-kneaded without the mixing described above.

In the polyolefin-based resin composition, known additives such as, for example, an antioxidant, a neutralizer, a lubricant, an anti-dripping agent, an antistatic agent, a nucleating agent and the like, may be used in combination, so far the object and effect of the present invention are not damaged. The compounding of these additives can be appropriately carried out when the respective components of the polyolefin-based composition are mixed or melt-kneaded.

The polyolefin-based resin composition is obtained by melt-kneading the polyolefin-based resin(A) and the polymer fine particles (B) containing 0.10 to 90% by weight of the volatile component using a known means, for example, an extruder, kneader or the like, after or without the mixing operation. Usually after the melt-kneading, the kneaded mixture is pelletized using a known method. The kneading temperature in an extruder is usually 180 to 280%, and preferably 200 to 250° C.

The volatile component in the polymer fine particles in the polyolefin-based resin composition is little contained because the volatile component is volatized during the melt-kneading.

The polyolefin-based resin composition of the present invention is suitably used for production of a film. As the production process of a film, a known process is used. For example, a process which contains melt-kneading the polyolefin-based resin, extruding it in sheet-like, cooling the extruded sheet, for example, with a cooling roll, and then stretching to at least uni-axial direction (uni-or bi-axial direction) while heating to obtain a stretched film is illustrated.

The thickness of the film is not specifically limited, and usually 1 to 200 μm, preferably 5 to 100 μm, and further preferably 8 to 50 μm.

The present invention is further illustrated in detail below according to Examples and Comparative Examples, but the present invention is not specifically limited by Examples below. Further, the detailed descriptions of the present invention and the measured values of the respective items in Examples were measured according to the methods described below.

1. Measurement of the Amount of a Volatile Component Contained in a Polymer Fine Particles (Unit: % by Weight)

Using a vacuum constant-temperature oven (manufactured by YAMATO KAGAKU, Ltd., DP32 Type) about 5 g of a sample was dried at 110° C. for 1 hour under 0.1 kPa, left alone to be cooled to room temperature after drying, and the samples before drying and after drying were weighted using an electric balance which can measure to an order of 0.01 g to determine the amount according to the equation below:

Amount of volatile component (% by weight)={(weight before drying−weight after drying)/weight before drying}×100

Further, the polyolefin-based resin used in Examples below is a propylene polymer powder having an MFR of 2.3 g/10 min. and a CXS of 3.0% by weight, and the amount of the volatile component contained in the propylene polymer powder was 0% by weight.

2. Film Properties
(1) Haze (Unit: %)
It was measured according to ASTM D-1003.
(2) Light Scattering Index (LSI) (Unit: %)
It was measured by a LSI tester (±0.4° to 1.2° of transmitted light scatter is received) manufactured by TOYO-SEIKI Co., Ltd. LSI value was made as a measure of see-through feeling.
(3) Anti-Blocking Property (Unit: MPa or kg/12 cm$^2$):
Using films of 120 mm×30 mm, the films are mutually piled up, and condition adjustment was carried out at 60° C. for 3 hours under a load of 500 g/40 mm×30 mm. Then, the laminate was left alone for 30 minutes or more under an atmosphere at 23° C. and a humidity of 50% for condition adjustment. Then, tensile test was carried out at a speed of 200 mm/min. using a shear tensile tester, and the strength required for peeling a film was measured. Measurement was carried out 4 times per one sample, and the mean value was calculated to make the value of anti-blocking property of the film.
(4) Numbers of White Spot: (Unit: Pieces/25 cm$^2$)
The numbers of white spots having a size of about 0.2 mm to 1 mm which are in an arbitrary region of 5 cm×5 cm of a film were determined by visual inspection. The operation was repeated twice to determine the mean value.

EXAMPLE 1

(a) Production of Polymer Fine Particle

Into a pressure glass vessel equipped with a stirrer and a reflux cooler, 380 parts by weight of methanol, 20 parts by weight of deionized water, 34 parts by weight of styrene, 60 parts by weight of 2-ethylhexyl acrylate, 11 parts by weight of divinylbenzene, 2.5 parts by weight of hydroxypropyl cellulose and 2 parts by weight of tert-butylperoxy-2-ethylhexanoate were charged, the mixture was homogeneously dissolved, then the vessel was closed, and the mixture was polymerized at 90° C., for 10 hours. Then, after a mixed solution of 200 parts by weight of methanol, 48 parts by weight of styrene, 4 parts by weight of 55% divinylbenzene and 1 part by weight of 2,2'-azobis(2,4-dimethylvaleronitrile) was added thereto at 60° C. over 20 minutes, the mixture was further subjected to polymerization at 60° C. for 4 hours, and an organic solvent slurry of polymer fine particles was obtained. When the particle diameter of the fine particles collected by partially sampling from the organic solvent slurry was measured, the weight average particle diameter was 1.2 μm.

Successively, pressured steam was blown in the slurry, the mixture of methanol and water evaporated was recovered with a condenser. When the temperature of polymerization solution reached at 99° C., the blow of steam was completed to obtain an aqueous slurry of polymer fine particles. Further, the aqueous slurry obtained was separated by filtration under vacuum using a No. 1 qualitative filter paper to obtain a polymer fine particle wet cake containing a volatile component of 72% by weight.

(b) Adjustment of Amount of Volatile Component Contained in Polymer Fine Particles About 500 g of the polymer fine particles having a volatile component amount of 72% by weight which was obtained in the fore-mentioned (a) was weighed, and this was charged in a precision thermostatic chamber (DF61 type manufactured by YAMATO KAGAKU Co., Ltd.) and dried at 120° C. for 5 hours. The amount of the volatile component contained in the polymer fine particles obtained was 0.14% by weight.

(c) Pelletization of Polyolefin-Based Resin Composition

Per 100 parts by weight of the fore-mentioned propylene polymer powder (MFR=2.3 g/10 min.) as the component A, 0.3 parts by weight of the polymer fine particles containing 0.14% by weight of the volatile component as the component B, 0.1 part by weight of calcium stearate as a neutralizing agent, 0.2 parts by weight of BHT (2,6-di-tert-butyl-4-methylphenol) as an antioxidant, and 0.2 part by weight of Irganox 1010 (manufactured by CIBA Specialty Chemicals Co., Ltd.) were mixed with a Henschel mixer, and then the mixture was melt-kneaded and then granulated at 220° C. using an extruder to be pelletized. The compounding amounts of the polyolefin-based resin and the polymer fine particles in the pellet were shown in Table 1.

(d) Preparation of Stretched Film

The polyolefin-based resin composition pellet prepared in the fore-mentioned (c) was melt-extruded at a resin temperature of 260° C. and rapidly cooled by a cooling-roll at 60° C. to obtain a sheet having a thickness of 0.8 mm. After preliminary heating, the sheet was stretched 5-fold to a vertical direction at a stretching temperature of 145° C. by a roll peripheral speed difference of a vertical stretcher, and further stretched 8-fold to a horizontal direction at a stretching temperature of 157° C. by a tenter type stretcher, and successively, heat-treated at 165° C. to obtain a film having a thickness of 20 μm, and then a corona treatment of one side surface of the film was carried out. The physical properties of the film were shown in Table 2.

EXAMPLE 2

(b) Adjustment of Amount of Volatile Component Contained in Polymer Fine Particle About 500 g of the polymer fine particles having a volatile component amount of 72% by weight described in Example 1 (a) was weighed, and this was charged in an precision thermostatic chamber (DF61 type manufactured by YAMATO KAGAKU Co., Ltd.) and dried at 110° C. for 7 hours. The amount of the volatile component contained in the polymer fine particles obtained was 1.8% by weight.

(c) Pelletization of Polyolefin-Based Resin Composition

Pelletization was carried out in the same manner as in Example 1 (c). The compounding amounts of the polyolefin-based resin and the polymer fine particles in the pellet were shown in Table 1.

(d) Preparation of Stretched Film

A film was prepared in the same manner as in Example 1 (d). The physical properties of a film were shown in Table 2.

EXAMPLE 3

(b) Adjustment of Amount of Volatile Component Contained in Polymer Fine Particle About 500 g of the polymer fine particles having a volatile component amount of 72% by weight described in Example 1 (a) was weighed, and this was charged in an precision thermostatic chamber (DF61 type manufactured by YAMATO KAGAKU Co., Ltd.) and dried at 100° C. for 3.5 hours. The amount of the volatile component contained in the polymer fine particles obtained was 8% by weight.

(c) Pelletization of Polyolefin-Based Resin Composition

Pelletization was carried out in the same manner as in Example 1 (c). The compounding amounts of the polyolefin-based resin and the polymer fine particles in the pellet were shown in Table 1.

(d) Preparation of Stretched Film

A film was prepared in the same manner as in Example 1 (d). The physical properties of a film were shown in Table 2.

EXAMPLE 4

(b) Adjustment of Amount of Volatile Component Contained in Polymer Fine Particles The polymer fine particles having a volatile component amount of 72% by weight described in Example 1 (a) was used as it was.

(c) Pelletization of Polyolefin-Based Resin Composition

Pelletization was carried out in the same manner as in Example 1 (c) except that per 100 parts by weight of the propylene polymer powder (MFR=2.3 g/10 min.) being the component A, 1.1 parts by weight of the polymer fine particles containing 72% by weight of the volatile component as the component B was used. The compounding amounts of the polyolefin-based resin and the polymer fine particles in the pellet were shown in Table 1.

(d) Preparation of Stretched Film

A film was prepared in the same manner as in Example 1 (d). The physical properties of a film were shown in Table 2.

COMPARATIVE EXAMPLE 1

(a) Synthesis of Polymer Fine Particle

The polymer fine particles were synthesized in the same manner as in Example 1. Successively, pressured steam was blown in the same manner as in Example 1, and the mixture of methanol and water evaporated was recovered with a condenser. When the temperature of polymerization solution reached at 99° C., the blow of steam was completed to obtain an aqueous slurry of polymer fine particles. Further, the aqueous slurry obtained was separated by filtration under vacuum using a No. 1 qualitative filter paper to obtain a polymer fine particle wet cake having a volatile component amount of 45% by weight.

(b) Adjustment of Amount of Volatile Component Contained in Polymer Fine Particle The polymer fine particles having a volatile component amount of 45% by weight which was obtained in the fore-mentioned (a) was charged in a Nauter dryer, a jacket temperature was adjusted to 134° C. by steam, the pressure of inside was reduced to 667 Pa (about 5 Torrs), and drying was carried out while homogeneously stirring. When the temperature of the sample of inside reached at 120° C., the drying was stopped. The amount of the volatile component contained in the polymer fine particles obtained was 0.08% by weight.

(c) Preparation of Polyolefin-Based Resin Composition Pellet

Pelletization was carried out in the same manner as in Example 1 (c). The compounding amounts of the polyolefin-based resin (component A) and the polymer fine particles (component B) in the composition were shown in Table 1.

(d) Preparation of Stretched Film

A film was prepared in the same manner as in Example 1(d). The physical properties of the film were shown in Table 2.

COMPARATIVE EXAMPLE 2

(b) Adjustment of Amount of Volatile Component Contained in Polymer Fine Particle Per 100 parts by weight of the polymer fine particles having a volatile component amount of 72% by weight described in Example 1 (a), 1302 parts by weight of water was added. The amount of the volatile component in the polymer fine particles obtained was 98% by weight.

(c) Pelletization of Polyolefin-Based Resin Composition

When pelletization was carried out in the same manner as in Example 1 (c), a mixture of the polyolefin-based resin powder and the polymer fine particles becomes in a moist condition because of the volatile component, and a feeding trouble of raw materials not to be supplied enough to the cylinder of an extruder occurred. Further, the resin was foamed at the die part of the extruder, a strand was cut, the condition of the resin became unstable, and a pellet was not obtained. The compounding amounts of the polyolefin-based resin and the polymer fine particles were shown in Table 1. A film forming could not be carried out because the pellet was not obtained.

As understood from Tables 1 and 2, Examples 1 to 4 had little white spots and gave a film having good appearance. To the contrary, the film of Comparative Example 1 not satisfying the volatile component amount contained in the polymer fine particles which is an essential condition of the present invention, generated many white spots and had bad appearance. Pelletization and a film forming could not be carried out in case of Comparative Example 2. Further, Examples 1 to 4 had also no problem in transparency (Haze), see-through feeling (LSI) and anti-blocking property.

TABLE 1

Compounding amounts of the polyolefin-based resin and the polymer fine particles in polyolefin-based resin pellet

|  | Compounding amount of polyolefin-based resin Parts by weight | Amount of volatile component contained in polymer fine particle % by weight | Compounding amount of polymer fine particle containing volatile component Parts by weight |
|---|---|---|---|
| Example 1 | 100 | 0.14 | 0.3 |
| Example 2 | 100 | 1.8 | 0.3 |
| Example 3 | 100 | 8 | 0.3 |
| Example 4 | 100 | 72 | 1.1 |
| Comparative Example 1 | 100 | 0.08 | 0.3 |
| Comparative Example 2 | 100 | 98 | 15 |

TABLE 2

Physical properties of film

|  | Amount of polymer fine particle added % by weight | Haze | LSI | Anti-blocking property MPa (kg/12 cm$^2$) | Numbers of white spot (size 0.2 to 1 mm) Pieces/ 25 cm$^2$ |
|---|---|---|---|---|---|
| Example 1 | 0.3 | 3.1 | 2.3 | 0.71 (0.6) | 8 |
| Example 2 | 0.3 | 3.0 | 2.4 | 0.71 (0.6) | 6 |
| Example 3 | 0.3 | 3.0 | 2.3 | 0.59 (0.5) | 8 |
| Example 4 | 0.3 | 2.4 | 2.7 | 0.71 (0.6) | 6 |
| Comparative Example 1 | 0.3 | 3.3 | 2.6 | 0.71 (0.6) | 80 |

The polyolefin-based resin of the present invention has a good dispersion of a polymer fine particles as an anti-blocking agent to a polyolefin-based resin, and a film made of the composition can be suitably used in broad fields such as food packaging, textile packaging and the like, because of excellent physical properties of the film.

What is claimed is:

1. A process for producing a polyolefin-based resin composition, which comprises melt-kneading 100 parts by weight of a polyolefin-based resin and not less than 0.05 parts by weight and less than 2 parts by weight of polymer fine particles containing 0.10 to 90% by weight of a volatile component based on the weight of the polymer fine particles and the volatile component, as an anti-blocking agent;

wherein said polymer fine particles are made of polymer obtained by polymerizing at least one monomer selected from the group consisting of styrene, methyl acrylate, methyl methacrylate, 2-ethylhexyl acrylate and 2-ethylhexyl methacrylate, and wherein said volatile component is selected from the group consisting of saturated hydrocarbons, ketones, aldehydes, ethers, mixtures thereof, water and mixtures of water and alcohol.

2. The process according to claim 1, wherein the polymer fine particles contain the volatile component of 0.10 to 80% by weight based on the weight of the polymer fine particles and the volatile component, and have a weight average particle diameter of 0.5 to 15 μm.

3. A polyolefin-based composition obtained by the process of claim 1.

4. A polyolefin based composition obtained by the process of claim 2.

* * * * *